Dec. 10, 1940.  A. H. DICKINSON ET AL  2,224,762
DATA REPRODUCING MACHINE
Filed June 16, 1939   11 Sheets-Sheet 1

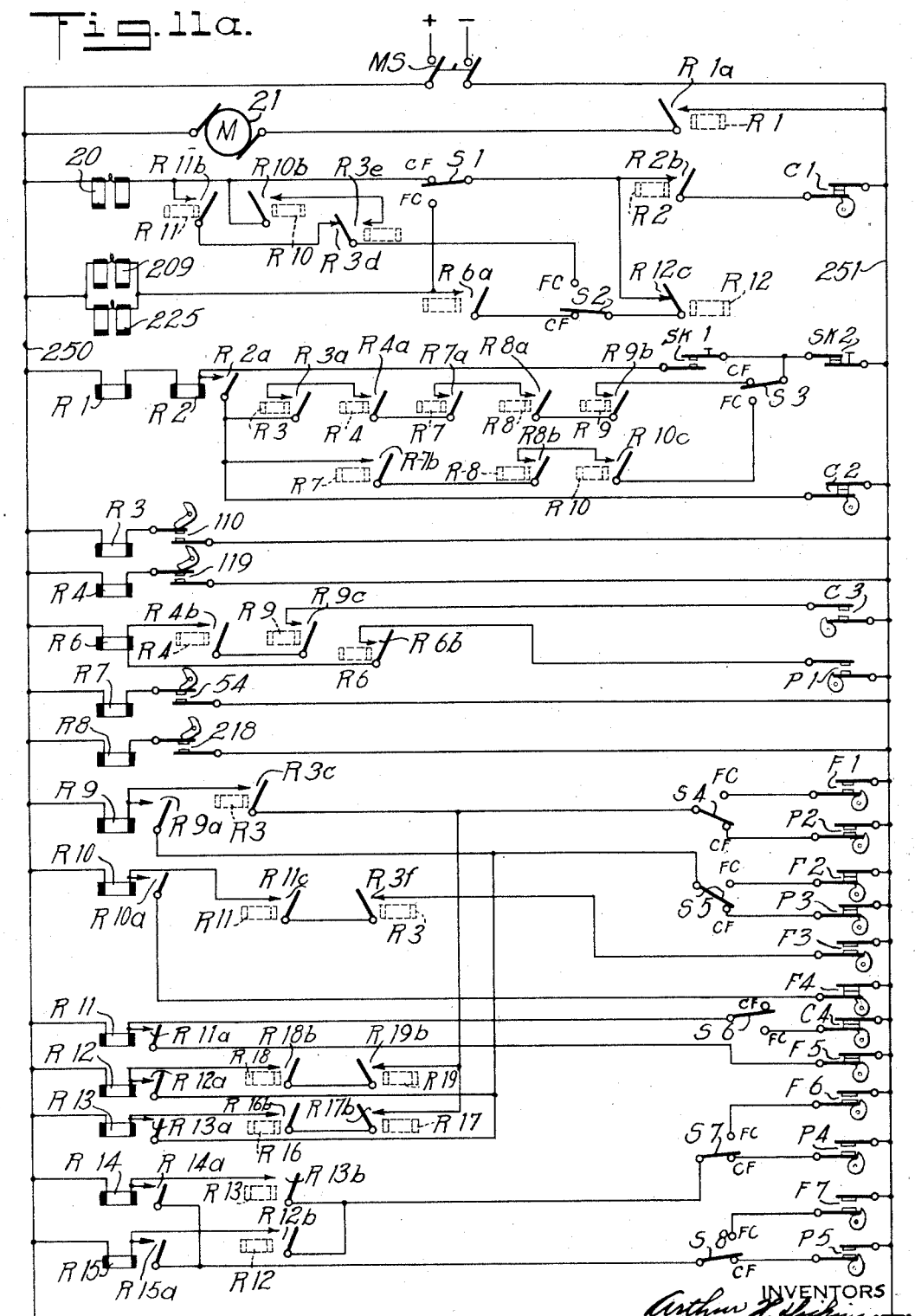

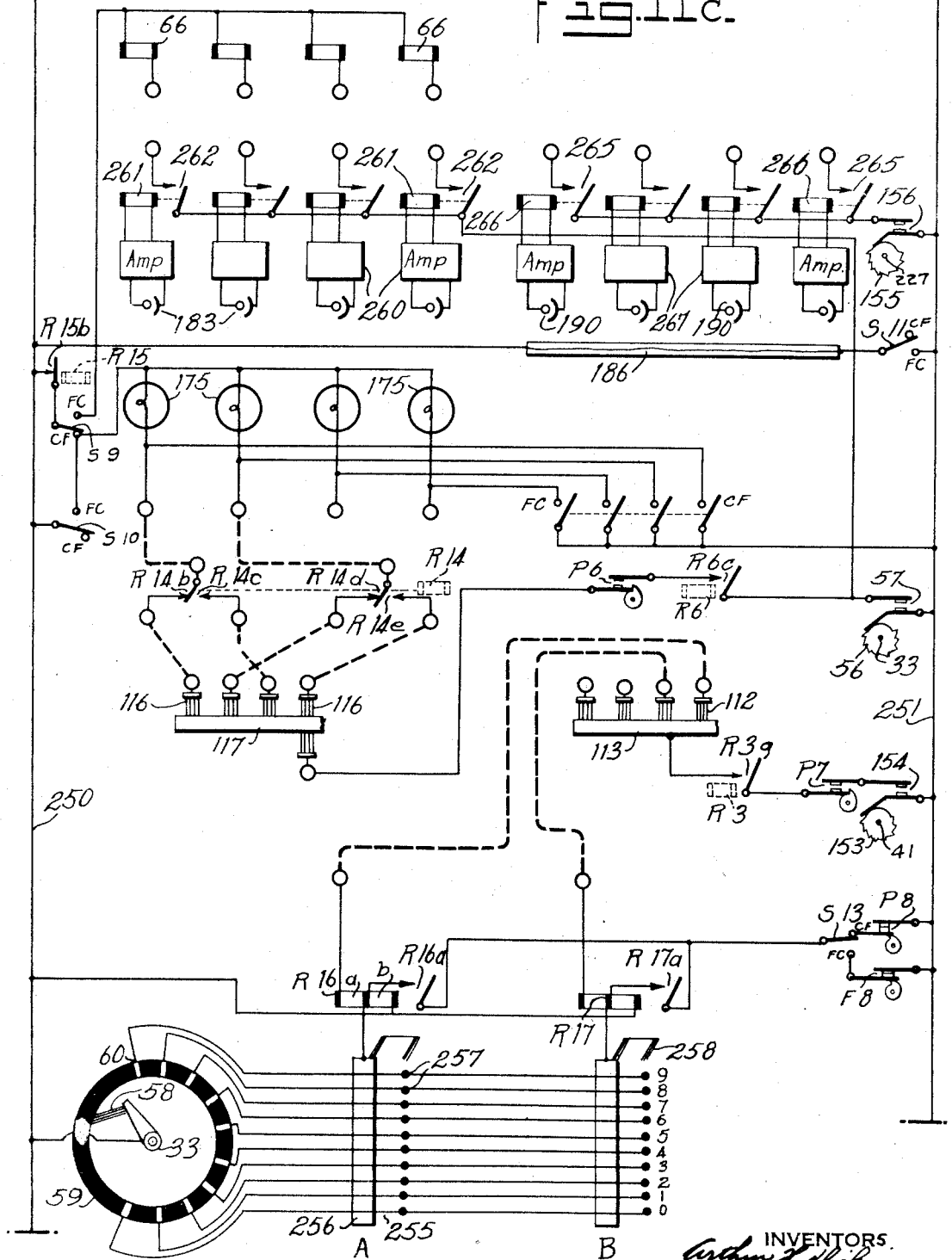

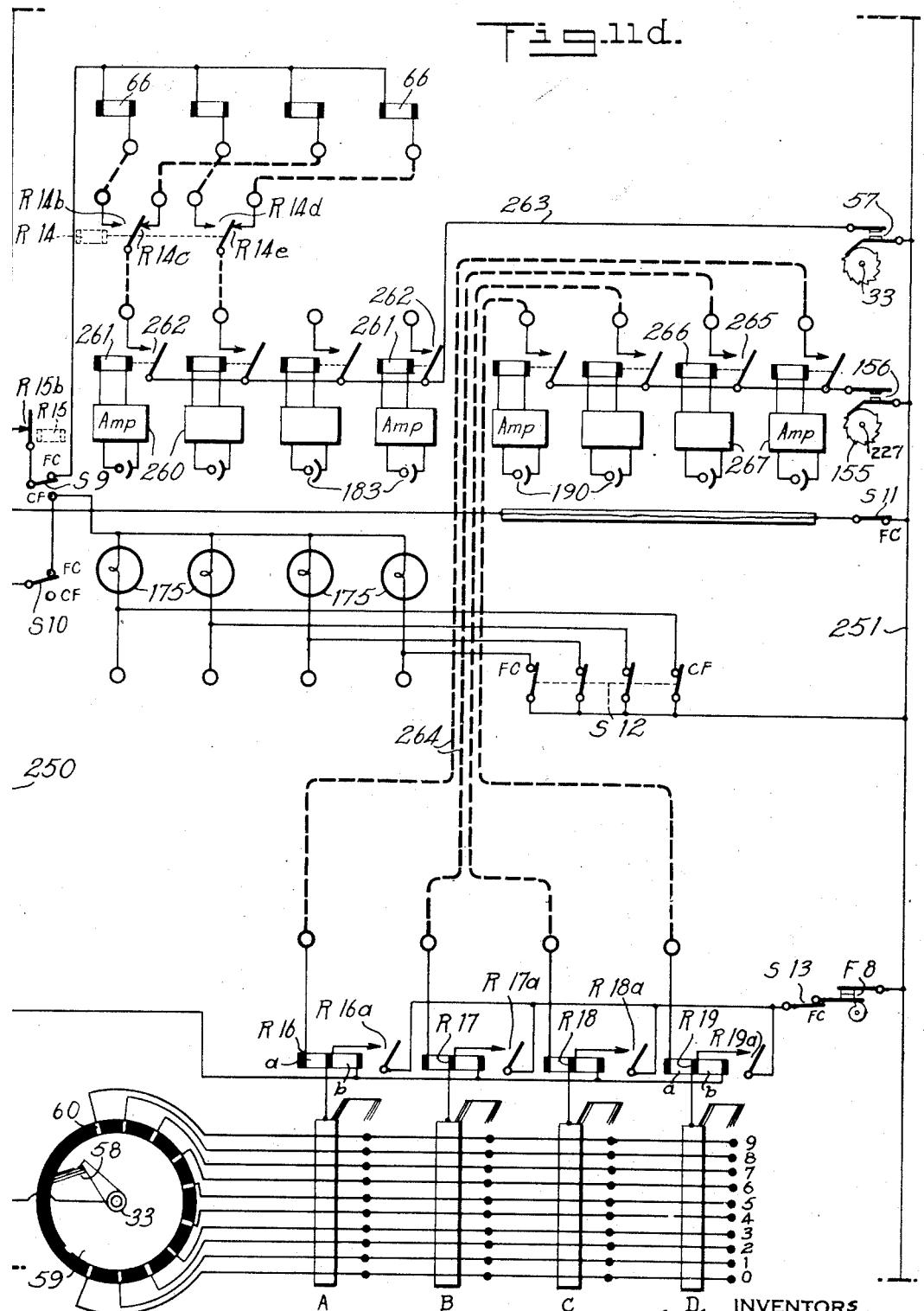

Dec. 10, 1940.  A. H. DICKINSON ET AL  2,224,762
DATA REPRODUCING MACHINE
Filed June 16, 1939    11 Sheets-Sheet 11
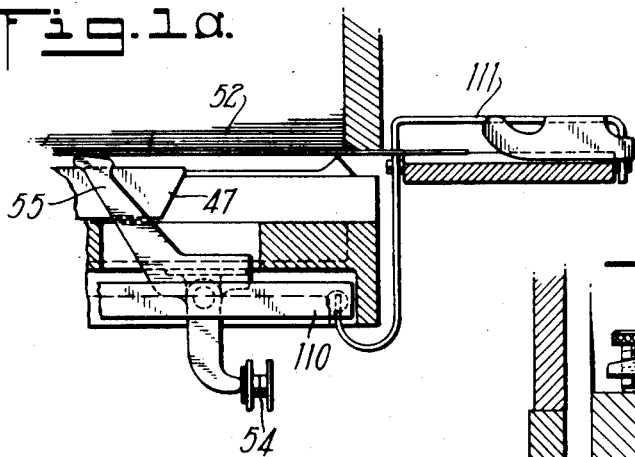
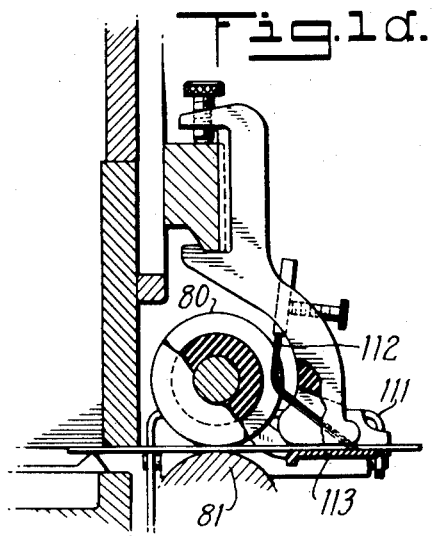
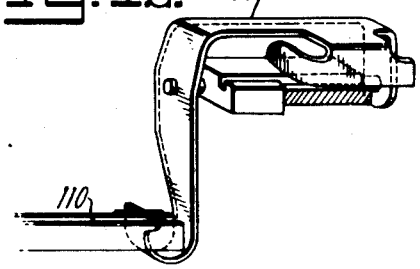
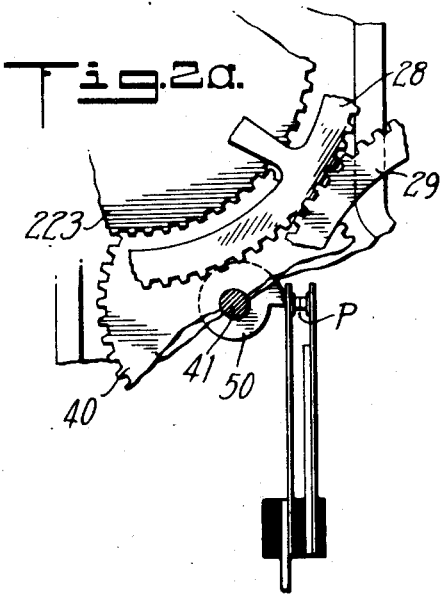
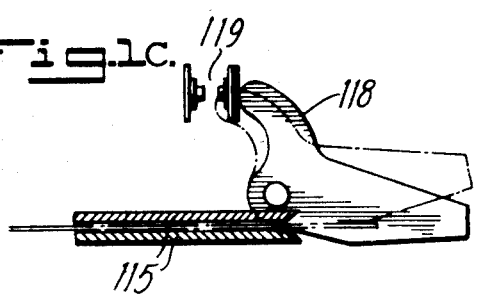

Patented Dec. 10, 1940

2,224,762

UNITED STATES PATENT OFFICE 2,224,762

DATA REPRODUCING MACHINE

Arthur H. Dickinson, Scarsdale, and Robert I. Roth, Valley Stream, N. Y., assignors to International Business Machines Corp., New York, N. Y., a corporation of New York Application June 16, 1939, Serial No. 279,504

11 Claims. (Cl. 164—115)

This invention relates to a data reproducing machine and more particularly to a machine capable of reproducing coded data representations from one type of carrying medium to another and different type of carrying medium. The present invention is an improvement of applicants' co-pending application Serial No. 279,503, filed June 16, 1939.

The data carrying mediums may be of the types or forms suitably adapted for the automatic control of well-known types of machines, such as statistical machines, typewriting machines, or the like. For example, in mechanized accounting systems, employing various types of known statistical machines, record cards, having data representations disposed thereon, are used for controlling the operations of the machines used in such systems; when utilizing the well-known Hollerith type of statistical card, the data representations usually are in the forms of perforations, which are formed at different columnar index point positions. The codes employed may be of different types, such as the combinational perforation code system, or single perforation code system.

It has been suggested to employ different types of control records other than the perforated record cards, for controlling the machines referred to, for example, one type suggested, being a record medium having a layer of light sensitive emulsion disposed thereon which, when exposed to suitable recording mechanisms, and properly conditioned, is adapted to bear the data representations in the form of imperforate control spots disposed in various code positions thereon. These control spots, or index points, may then serve as light modifying or modulating areas for controlling the statistical or other operations of the machines.

It has been found, that, when it is desired to employ such machines controlled by different types of control records, provision must be made, whereby the data representations carried by one type of records can be reproduced and formed on the other type of records, or vice versa. To simplify the description to follow, the illustration and disclosure thereof, will be limited to suitable mechanism which may be conditioned, whereby the data representations, in the form of coded perforations on a record control card, can be reproduced on a photographic control record in the form of differently positioned control spots, or vice versa. These features broadly are shown and claimed in the said co-pending application.

In addition to the described features, the present invention proposes the provision of additional control mechanism, whereby during the record recording operations, class selection, field selection, and record elimination operations can be effected automatically. Class selection operations, as referred to hereinafter, can be defined as; the recording of data from one field of one of the record mediums on either one of two different fields on the other record medium, or stated more broadly, from one field of one of the record mediums into any of a number of fields on the other record medium. Specifically, one method of effecting such operations will be shown to comprise comparing certain class data on the record cards with preset data stored in suitable manually settable devices. In the event, the compared data agree, certain selected amount data, from the record cards, disposed in a particular field thereon is recorded in a different field on the photographic film record than it would normally be recorded, if the compared data was found not to correspond. It will be seen, that this operation can be effected similarly when the photographic film record is sensed for recording on, or perforating, the record cards accordingly.

Field selection operations can be defined as the reproduction of the sensed data selected from different fields on one of the record mediums, such as the record cards, in one field on the other record medium, namely, the photographic film record, or vice versa. These operations can be effected, by comparing the class data on one of the record mediums (for example, the record card) with the present data and, in the event, the compared data agree, a different field on the said record medium (record card) would be reproduced, or recorded, in a certain field on the other record medium (photographic film record), in which said field other data is recorded from a different field of the first record medium (record card), whenever the compared data does not correspond.

Record elimination operations can be defined as, the elimination of recording any of the data from one of the record mediums (such as the record cards) on the other record medium (the photographic film record). These operations can be effected, so that, upon agreement of the compared data, no recording operations are effected, for example, if agreement of the data occurs, circuits become effective for preventing film feeding operations during the sensing operations of the card, and for preventing the operation of the photographic recording mechanism.

Therefore, one of the objects of the present invention resides in the provision of means for reproducing upon a photographic film record the data sensed on a record card, and recording the data selected from one field on the card in a predetermined field on the film record, whenever the value of the class data on the record cards correspond to the values of predetermined selected data, or stated in other words, whenever the classification numbers on the record cards correspond to a predetermined selected number. Provision is also made whereby similar operations can be effected when the photographic film record is sensed for recording on, or perforating, the record cards.

Another object of the present invention resides in the provision of means, whereby the data sensed in different fields on the record cards is reproduced in the same field on the photographic film record and vice versa, whenever the class data correspond to predetermined values.

Another object resides in the provision of means, whereby recording upon the photographic film record of the data sensed on the record cards is suppressed, and vice versa, whenever certain class data correspond to predetermined values.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1a is a detail view showing the contacts 54 and associated lever 55.

Fig. 1b is a perspective view showing in detail the card controlled contacts 110.

Fig. 1c is a detail view of the contacts 119 and the associated lever 118.

Fig. 1d is a detail view showing the sensing brushes 112 and the associated conducting plate 113.

Fig. 2a is a detail view showing the cam controlled contacts P.

Figs. 7 and 8 are detail views of several types of data carrying mediums.

Fig. 9 is a detail view of the card stacker drum.

Figure 11B:
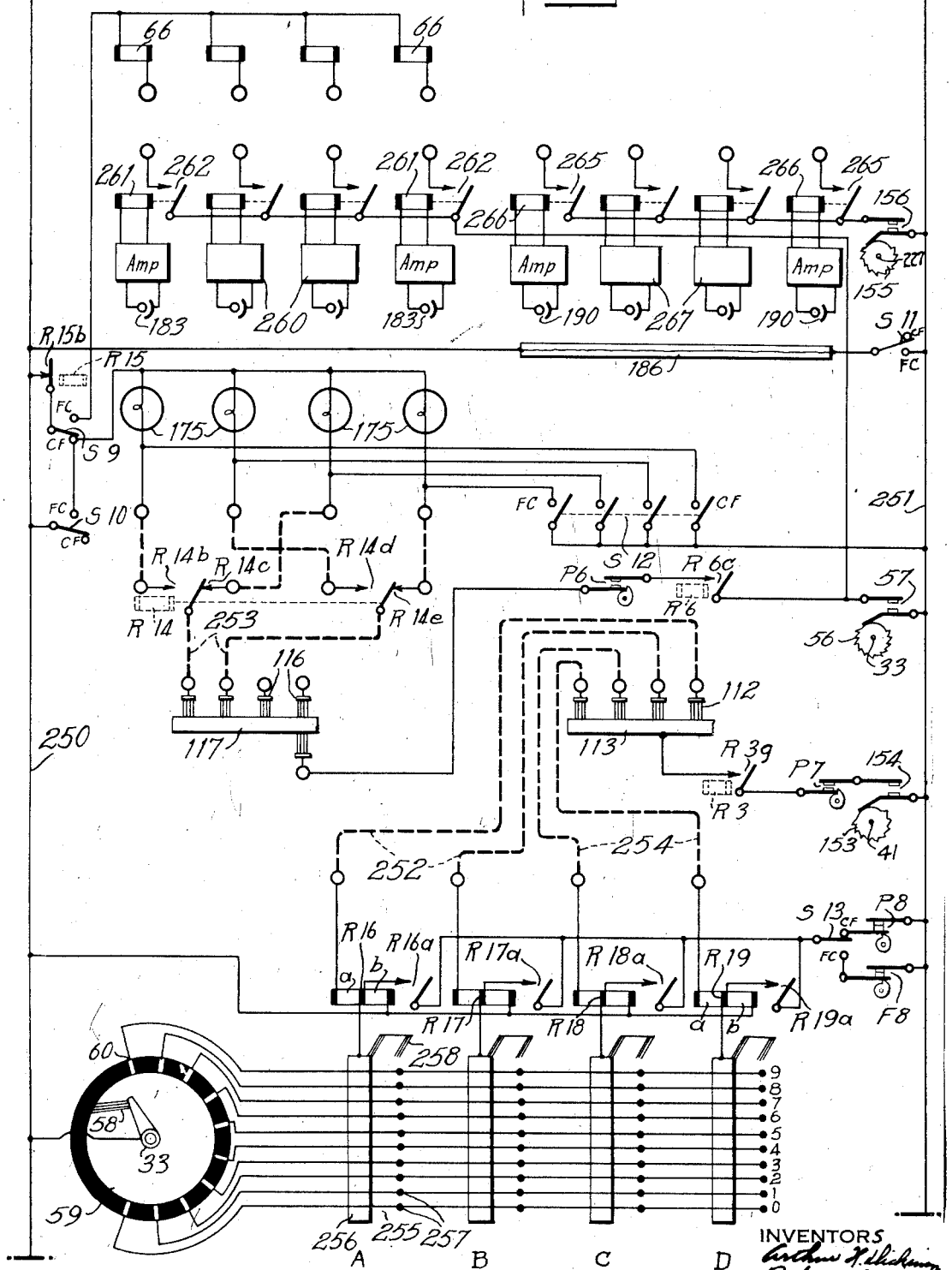

Fig. 11a when taken alternately and singly with Figs. 11b, 11c, 11d and 11e forms four different circuit diagrams of the machine.

General description

Briefly and broadly, the instant application discloses, by way of illustration, record card sensing and recording means, photographic film sensing and recording means, and associated control elements, all of which when suitably conditioned render the device effective, (1) for sensing the data representations, in the form of perforations on the record card, and thereafter, controlling the film recording means, at differential times, thereby reproducing the sensed data representations on the photographic film, in the form of discrete control spots, in different index point positions; (2) for sensing the differentially positioned control spots on the photographic film to control the record card perforating, or recording means, at differential times, thus reproducing the data representations sensed on the record cards in the form of differentially displaced perforations, or the like; (3) for effecting class selection, field selection, and record elimination operations during said recording operations.

Figure 1:
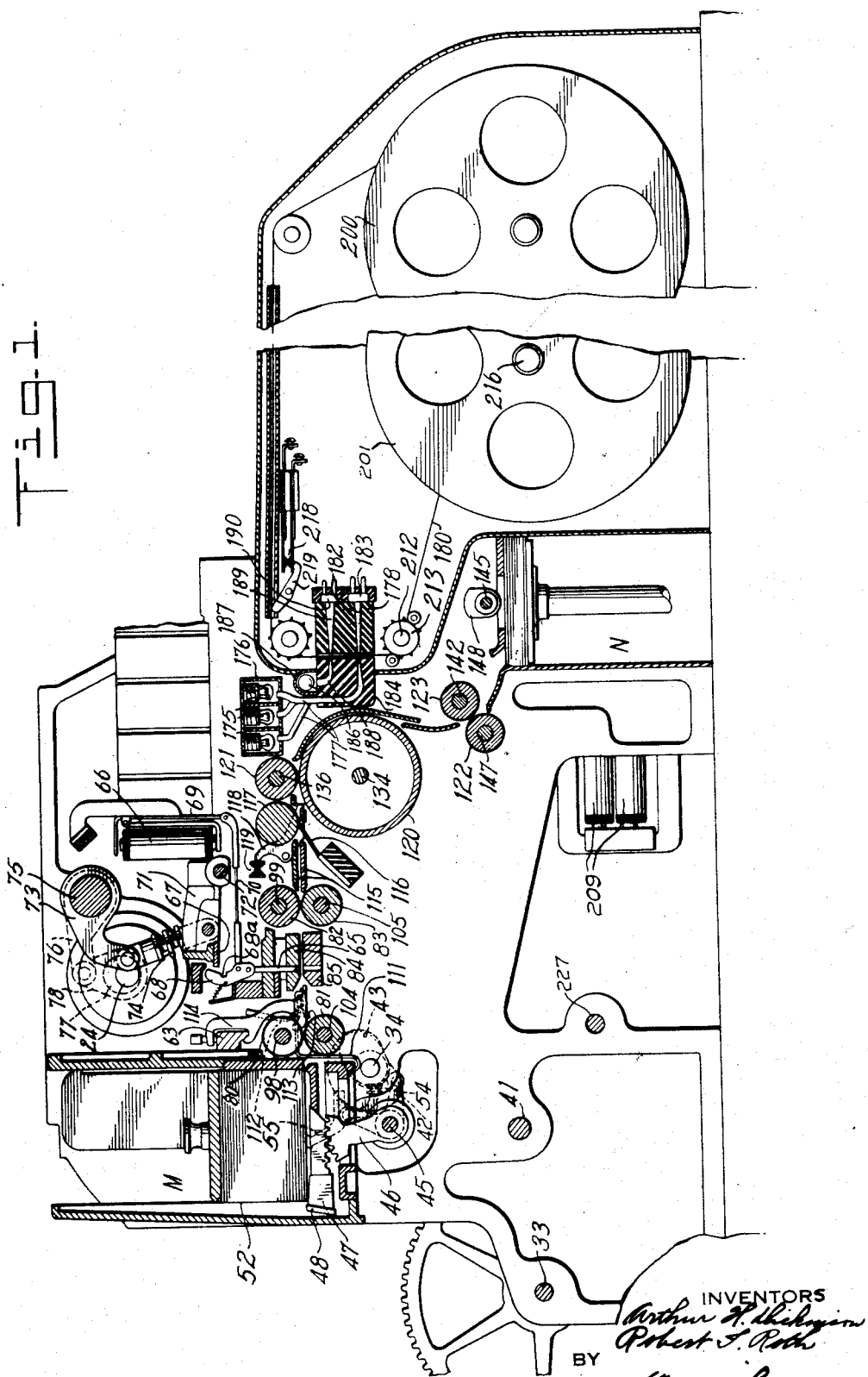
Fig. 1 is a sectional elevation view of the machine showing the feeding, sensing and reproducing devices.

Referring now to Fig. 1, the data reproducing mechanism, or device, is shown to comprise a record card magazine or supply hopper M, from which the cards are fed, singly, by the card feeding means, comprising in part, the card picker 47 and 48 and actuating arm 46 therefor, to the feed rollers 80 to 83, past the card sensing station including the brushes 116, to the card drum 120, feed rollers 122 and 123, and card stacking magazine, or hopper N. Interposed between the pairs of feed rollers 80, 81 and 82, 83 is shown one suitable type of card recording means, for example, the punch plungers 65 and control magnets 66 therefor, and an additional card sensing station including the brushes 112.

The photographic film 180 is fed, by means of the driving sprockets 213, from a supply reel 200 past a suitable sensing and recording station, comprising the individual light sources 175, associated light conducting quartz rods 177 and 182, and suitable light responsive means, such as photo-cells 183, and an additional sensing station comprising light source 186, quartz rods 188, 189, and photo-cells 190, to a suitably disposed take-up reel 201.

Suitable control and conditioning means are provided, so that the control units referred to can be conditioned, whereby the cards are fed, singly from the supply magazine to the card sensing station. At the said card receiving station the perforations on the record cards are sensed, at differential times, for controlling the energization of the corresponding individual light sources at the said differential times, for effecting the recording of the control spots on the photographic film. The mentioned control units can also be conditioned so that the control spots on the photographic film are sensed, at differential times, for controlling the operation of the associated photo-cells, which photo-cells in turn, are effective to control the card perforating control magnets, thereby effecting perforation of the record cards in accordance with the data sensed.

By referring to Figs. 7 and 8, facsimiles of portions of the perforated record cards and recorded photographic film are shown. In Fig. 7, the reference character 53 represents the differentially disposed perforations on the record card 52, whereas in Fig. 8, the reference character 181 represents the differentially disposed control spots, or light modifying areas on the control film record 180.

By referring to Figs. 11b and 11c, suitable manually settable devices 255 are shown, comprising the common conducting segments 256, and the individual conducting segments 257, which are electrically connected, by the positionable brushes 258. The corresponding individual conducting segments 257 are connected in common circuits, which are in turn connected to the individual conducting segments 60 of the emitter device 59.

A common brush 58 is provided, in the emitter device, to engage the segments 60 successively, thus completing, successively, the circuits to the conducting segments of the said storing or settable devices, the purpose of which will be understood as the description progresses.

*Record card feeding means*

Referring now to Figs. 1 to 4, it will be shown, how the card feed magnets 20 control the operation of the record card feeding means. A motor 21 (Fig. 11a), suitably mounted in the machine, is effective to rotate the shaft 24, by means of the interconnecting belt 22, pulley 23, pawl 25 secured to said pulley, and ratchet 26, which is secured to shaft 24, and engaged by the pawl 25. In this manner, the shaft 24 is rotated continuously as long as the motor is operated. Gear 27, attached to the shaft 24, is effective to drive gears 28 and 29, by means of the interconnecting gears 30 and 31, both of which are affixed securely to shaft 32. Gear 29 is secured to shaft 33, thus it is seen, that shafts 32 and 33 are arranged to be rotated continuously, similarly as shaft 24, as long as the motor is operated. A single tooth ratchet 35 is adapted to be secured to gear 28, both gear and ratchet being rotatably mounted on the supporting shaft 34, and to which shaft an arm 36 is attached. A spring actuated dog 37 is pivotally mounted on the arm 36, and arranged to be held out of engagement with the ratchet 35 by the armature 38, which armature is associated with, and controlled by, the magnets 20. From the description thus far, it is understood, that upon energization of the magnet 20, the associated armature 38 is displaced, sufficiently out of the path of dog 37 and arm 36, to release these elements, and permit the dog 37 to engage the single tooth of ratchet 35, thus effecting rotation of the shaft 34, by means of the ratchet and associated gearing. Shaft 34 is rotated, as long as the magnet 20 remains energized, and in turn, effects rotation of gear 39 attached thereto, gear 40 and shaft 41 to which the last mentioned gear is secured.

Complementary cams 42 and 43 (see Fig. 5) are mounted on shaft 34, and are arranged to displace the two armed lever 44 on shaft 45, thereby rocking shaft 45 and the sector arms 46 (Fig. 1) attached thereto. The said sector arms are provided with gear teeth which mesh with racks on the card picker slides 47. A knife edge 48, attached to the slides, is adapted to engage the bottom card in the supply magazine or hopper M, and displace the card to the right (Fig. 1), when the picker slide is reciprocated by the cams 42 and 43 on shaft 34. The ratio of the described gearing is such that gear 28 rotates one revolution for each card cycle. Associated with the card hopper M are the contacts 54 (Fig. 1a) controlled by the lever 55, which contacts are adapted to remain closed, as long as cards are provided in the supply hopper, and upon exhaustion thereof, the said lever is permitted to swing in a clockwise direction to open the said contacts.

Figure 10:
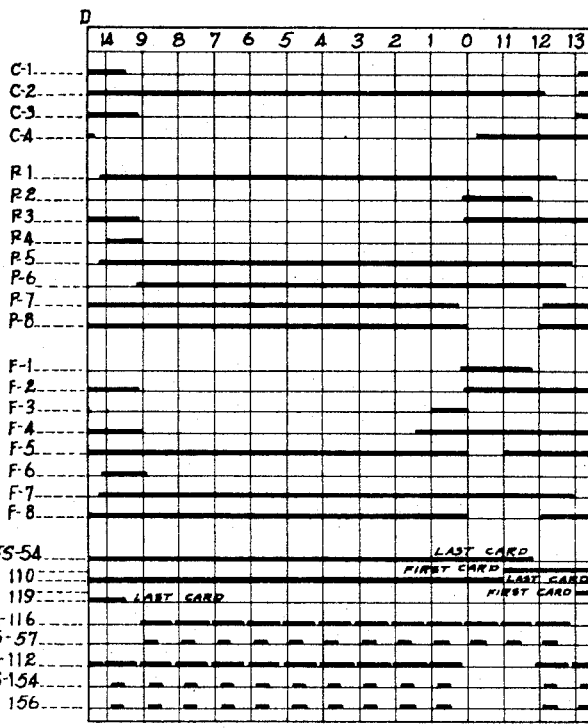
Fig. 10 represents a timing chart of several elements of the machine.

Upon deenergization of the magnet 20, the spring-urged armature 38 is positioned in the path of dog 37 and arm 36, so that disengagement of dog 37 and ratchet 35 is effected. A locking lever 49 is provided to maintain arm 36 in a predetermined position, thus locking the shafts 34 and 41 in the normal "D", or home position (see Fig. 10).

It should be mentioned, that cam elements 50 and 153 are provided, on the shaft 41 (Figs. 2, 2a and 4) to control the associated cam controlled contacts P1 to P8 (see wiring diagram), and contacts 154, respectively, and, that shaft 33 carries cam elements 51 to control the associated cam controlled contacts C1 to C4. Upon shaft 33 (see Fig. 4) an additional suitable cam 56 (see Fig. 11b) is mounted, which cam is adapted to operate the associated contacts 57, at different times, during the machine cycle (see Fig. 10), and in addition thereto, the brush 58 of the impulse emitter 59 (see Fig. 11b) is secured to the said shaft, so that the individual conducting segments 60 are connected to the common conductor 61, at different times, during the machine cycle, by means of the rotated brush, the purpose of which will be described later.

It has now been shown, how the record cards 52 are fed singly from the supply hopper M, by means of the card picker mechanism, whenever the control magnet 20 is energized. For further detailed description of the card feeding mechanism reference may be made to U. S. Reissue Patent #21,133, dated June 27, 1939, wherein elements similar to those just described are shown in detail. The individual record cards are now displaced and fed to the first set of feed rolls 80 and 81, which in turn, feed the cards past the card recording or perforating station. It will be shown, that the individual cards are positioned intermittently, by the feed rollers, past the card recording station and the card sensing stations. This mechanism will now be described in conjunction with the card recording or perforating means.

*Record card recording means*

Referring now to Fig. 1, the card recording station is shown to comprise recording means, illustrated in the form of record card perforating plungers 65, the operation of which, are selectively controlled by the magnets 66. The said magnets, upon energization, select the associated plungers so that, during the operation of the operating bar 67, the bar depresses or operates all the selected plungers, and thereby effect perforation of the record card. This operation is explained in detail, in the patent referred to hereinabove, and therefore the following brief description thereof is deemed sufficient. It is well known, that an individual plunger 65 and controlling magnet 66 are provided for each columnar area of the card, and that all the selected plungers are operated or depressed for all columnar areas simultaneously. It will be explained shortly, how the different index point positions of the cards are fed, intermittently, to the punching station, and that the perforating thereof is effected while the cards are stationary thereat.

The said plungers are shown provided with individual spring-urged pivoted interposer pawls 68, which are connected to the armatures 69 of the magnets, by call wires 70, so that, upon energization of a magnet, the connecting call wire is effective to swing the pawl 68 to the right, as viewed in Fig. 1, positioning the said pawl in the path of the operating bar 67. Upon depression of the said bar, which is adapted to cooperate with the notch 68a in the pawl, the related pawl is caused to be depressed to perforate the record card accordingly, and is then quickly withdrawn therefrom to permit feeding of the card to the next index point position.

The operating bar 67 is supported by a control bail 71 which is suitably pivoted on studs 72. The control bail is attached to arm 73, by means of an adjustable turnbuckle connection 74, said arm 73 being secured to shaft 75 which is also provided with an arm 76. An eccentric 77 is suitably disposed and formed on the shaft 24, which eccentric is encircled by an arm 78, the upper end of which is pivotally connected to the said arm 76.

It is now seen that, since the eccentric 77 is positioned on the constantly rotating shaft 24, shaft 75 and arm 73 are rocked to depress, at periodic intervals, the bail 71 and bar 67. As the said bail and bar are reciprocated, any of the pawls may be positioned by the call wires so as to effect engagement of the pawls and bar. Then, the connected pawls and plungers are depressed to perforate the card, and thereafter withdrawn immediately therefrom to permit the feeding of the card. Referring to Fig. 7, a facsimile of a portion of a perforated record card 52 is shown, the index point positions for several columnar areas are shown to be provided with perforations 53, at different positions in the columnar areas, to represent different data representations.

The feeding of the cards to, and from, the punching station is effected by the feed rollers 80, 81, 82 and 83. The cards are fed, intermittently, by rollers 80 and 81 between a stripper plate 84 and die plate 85, through which plates the plungers are adapted to be positioned.

Figure 5:
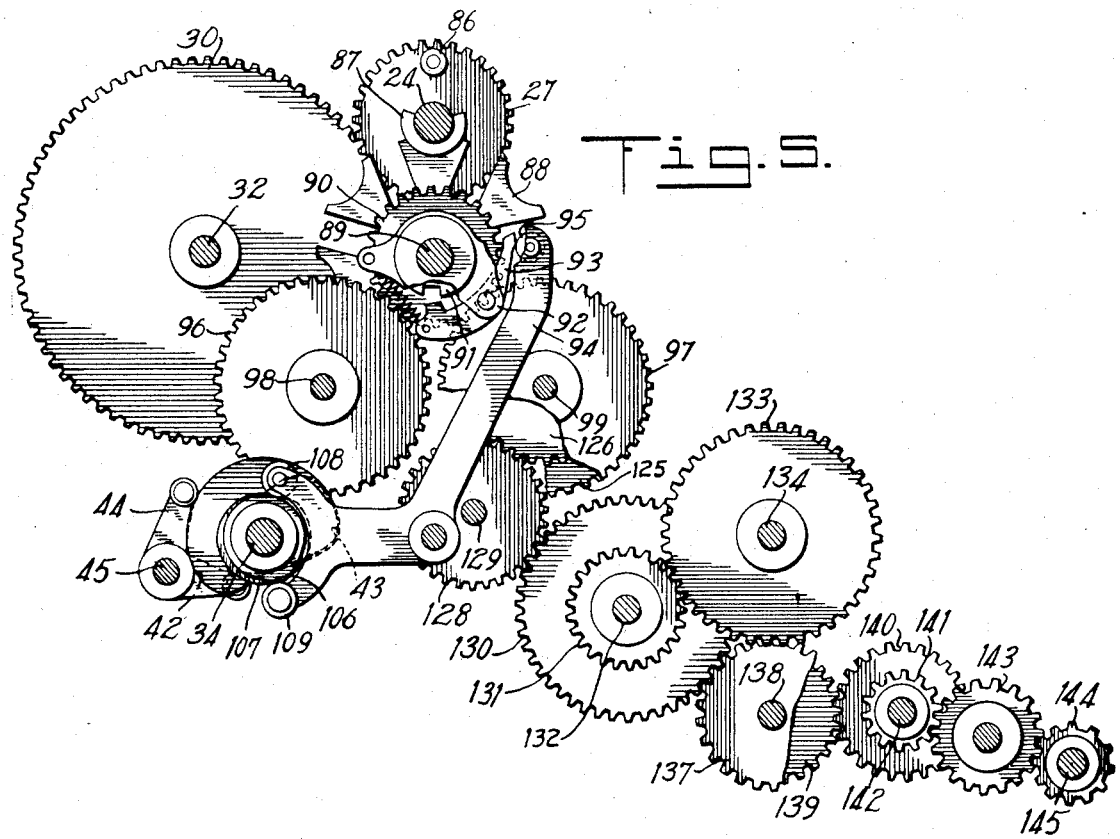
Fig. 5 is a sectional view along the lines 5—5 of Fig. 4.

The mechanism for operating the said feed rollers is as follows—referring now to Figs. 5 and 6, it is seen, that the continuously rotated gear 27 (also see Fig. 2) is provided with a Geneva roller 86 and segment 87, which cooperate with a Geneva disc 88 fixed on shaft 89. The Geneva disc is provided with seven radial slots, so that one revolution of gear 27 will rotate the shaft 89, one-seventh of a revolution, which partial rotation corresponds to a movement of one cycle point of the record card. Shaft 89 rotates continuously, with an intermittent motion, as long as the motor 21 is operated. Rotatably mounted on the shaft 89 is a gear 90, which has affixed thereto a single tooth ratchet 91, and secured to the shaft 89 is an arm 92, upon which a spring-urged dog 93 is pivoted. The spring-urged dog normally tends to engage the ratchet 91, however, disengagement of the dog and ratchet is effected by the lever 94 and attached roller 95, which roller, as shown in Fig. 5, engages the tail of the dog to position it, so as to prevent engagement thereof with the ratchet. When the said lever and roller are positioned to the right, as viewed in Fig. 5, and out of the path of the dog, the dog and ratchet are permitted to be engaged, thereby effecting rotation of gear 90 which is arranged to drive gears 96 and 97, which gears are fixed to shafts 98 and 99, respectively. Suitably disposed on shafts 98 and 99 (see Figs. 1 and 2) are gears 100 and 101, arranged to engage gears 102 and 103, which are pinned to shafts 104 and 105, respectively. Shafts 98 and 104 carry the first pair of feed rollers 80 and 81, respectively, whereas, the second pair of rollers 82 and 83 are carried by shafts 99 and 105, respectively.

It is evident now, that whenever the lever 94 is displaced out of the path of dog 93, engagement of the dog and ratchet 91 is effected to drive the feed rollers 80 to 83, intermittently, by means of the described gearing. As mentioned hereinabove, the gear ratio is such, that for each movement of shaft 89, the feed rollers are rotated to an extent sufficient to displace the card one cycle point, which displacement is equivalent to the distance between index point positions on the record card. The lever 94 is displaced, so as to release the dog 93, by the complementary cams 106 and 107 positioned on shaft 34, which cams are engaged by the rollers 108 and 109 carried by the horizontal portion of lever 94. It is remembered, that the rotation of shaft 34 is controlled by the magnet 20, and that, whenever this magnet is energized, shaft 34 is rotated continuously by the shaft 24 and associated gearing, described hereinabove. The cams 106 and 107 are designed, so that, if the magnet 20 is not energized and the shaft 34 is not rotated, lever 94 is positioned in the path of the dog 93, thereby preventing the dog from engaging the driving ratchet 91. However, should the said magnet be energized, cams 106 and 107 are turned, lever 94 displaced, permitting engagement of the said dog and ratchet, and establishing a driving connection between the intermittently driven shaft 89 and gear 90 for effecting intermittent movement of the card feed rollers 80 to 83.

Adjacent to rollers 80 and 81 is suitably disposed a control lever 111, which lever is effective to close a pair of associated contacts 110 (Figs. 1a, 1b and 11a), as long as cards are fed successively to, and from, the rollers 80 and 81, however, when cards are not fed successively thereto, the said contacts are opened.

*Record card sensing means*

Referring now to Fig. 1, the record cards are fed from the recording station to a sensing station, by the rollers 82 and 83, through the guide plates 115, and past the suitably mounted sensing brushes 116 (also see Fig. 11b) cooperating with the conducting roller 117. It is understood, that the index point positions of the intermittently fed cards are positioned properly at the sensing station, so that, whenever perforations are present in the cards at particular index point positions, the corresponding sensing brushes are adapted to extend therethrough and engage the conducting roller, thereby completing the circuits associated with said brushes and roller. The controlling circuits thus established will be described later herein. A facsimile of a portion of a suitable perforated record card 52 is shown in Fig. 7 provided with the differentially positioned perforations 53.

It should be mentioned, that at this sensing station a suitable and well known type of card lever 118 (see Fig. 1c) is provided for controlling the associated card lever contacts 119. Whenever a card is fed to, and present at, the sensing station, the said card lever is operated by the cards to close the card lever contacts, and whenever no cards are present to engage the card lever, the card lever contacts are opened.

In addition to the described data sensing station, an additional sensing station is provided, comprising brushes 112 (see also Figs. 1d and 11b) and conducting plate 113, which are disposed adjacent to the feed rollers 80 and 81. This sensing station is provided to sense the control data or class data disposed on the cards, and is employed, whenever class selection, field selection, or card eliminating operations are effected. The brushes 112 are carried in a holding frame 114, which may be selectively positioned on the supporting bar 63, so that the class data in any desired fields of the record cards can be sensed and, due to the disposition of these brushes with respect to the amount data sensing brushes 116, the class data on a card is sensed prior to the sensing of the amount data on the same card. In this manner, control circuits can be controlled by the class data sensed, thus conditioning certain circuits, which at a later time are controlled by the second sensing station. The said additional, or auxiliary sensing station (including brushes 112), in the instant application is used solely for sensing the class data, whereas the second, or main sensing station (including brushes 116), is used for sensing the amount data. This distinction is made at this time so that hereinafter, the card sensing stations will be referred to as the main and auxiliary card sensing stations.

Record card stacking means

From the main sensing station, the cards are fed to a hopper N (Fig. 1), by means of the card stacker drum 120, and associated feed roller 121, and feed rollers 122 and 123. The said drum and feed rollers are operated continuously, with an intermittent motion, and in a synchronous relationship with the feed rollers 80 to 83.

Figure 2:
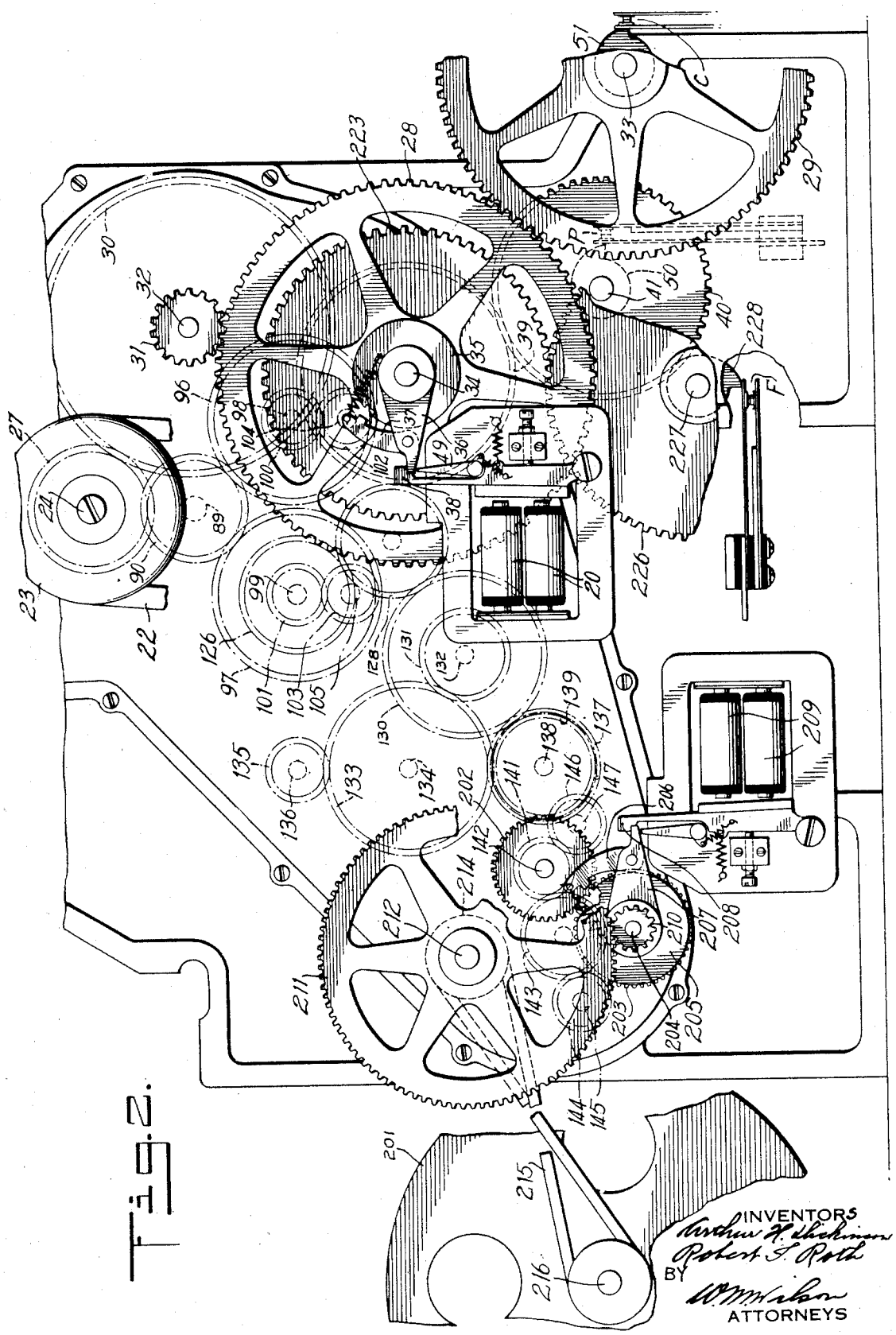
Fig. 2 is a rear elevation view of the machine showing the driving and associated gearing mechanism.
Figure 3:
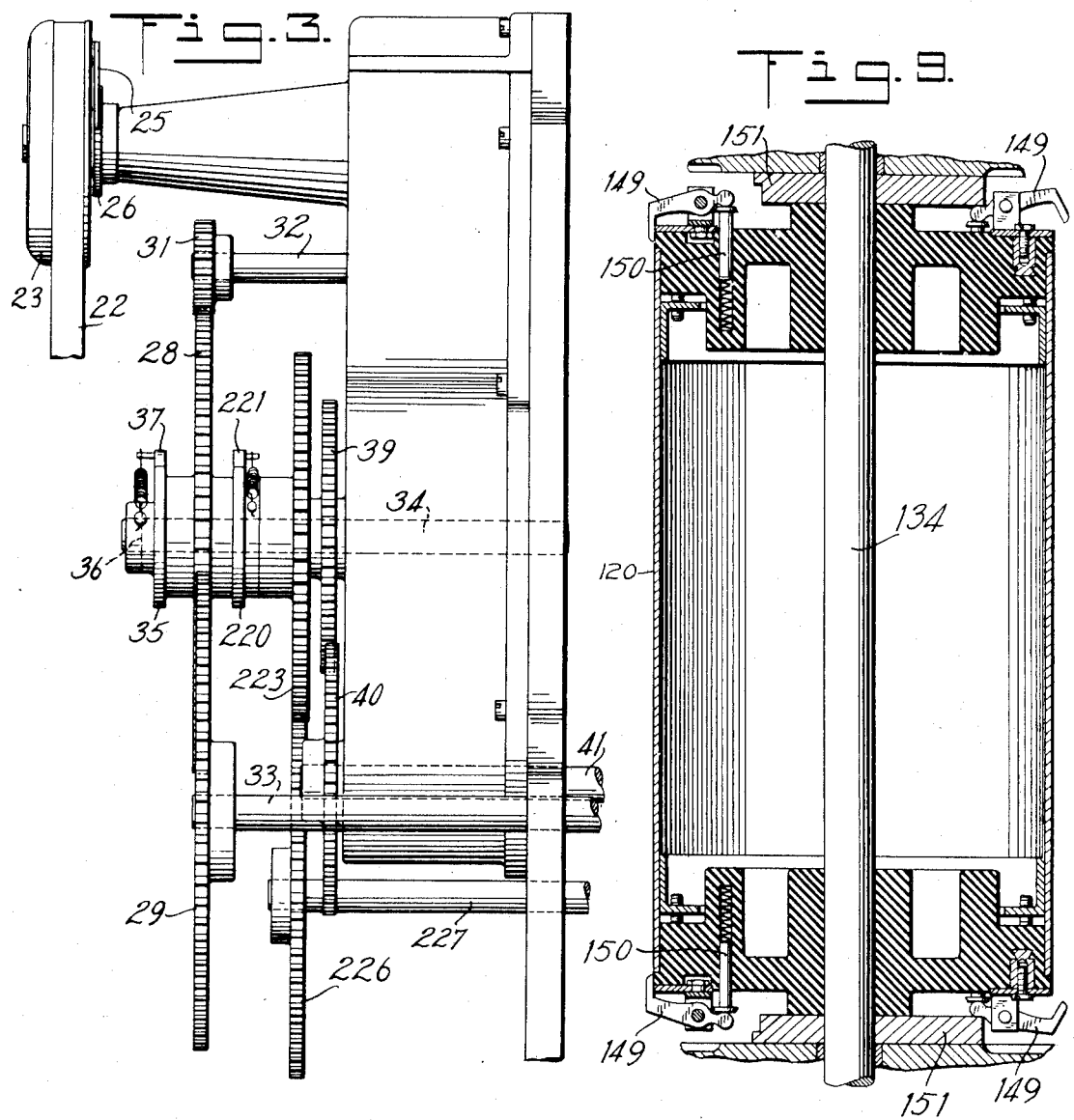
Fig. 3 is an end elevation view of the mechanism shown in Fig. 2.
Figure 6:
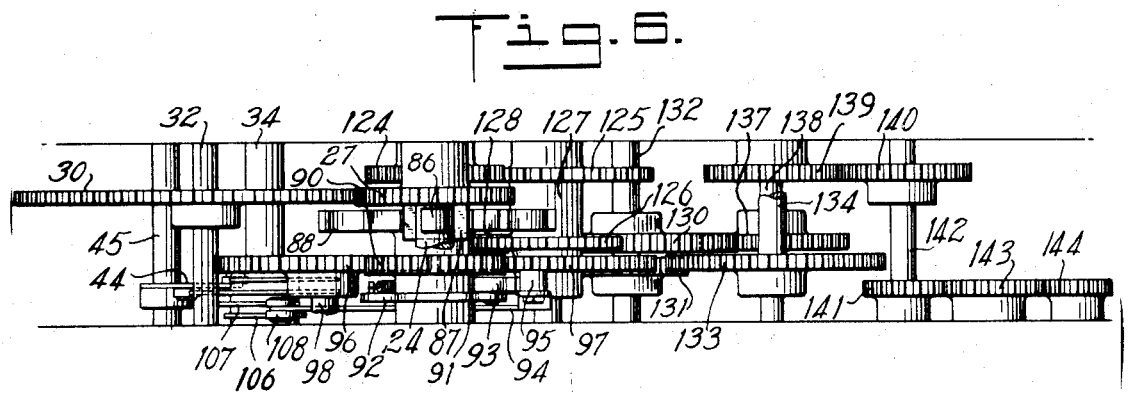
Fig. 6 is a plan view of the gearing shown in Fig. 5.

Referring now to Figs. 2, 5 and 6, it is remembered, that shaft 89 is rotated continuously with an intermittent motion. This shaft has secured thereto gear 124, which drives gears 125 and 126, both of which gears are mounted on a common hub 127, which is rotatably supported by shaft 89. By means of the gearing, comprising the gear 128 pinned to idler shaft 129, gears 130 and 131 pinned to shaft 132, the gear 126 is effective to rotate the gear 133 and associated shaft 134, upon which is mounted the stacker drum 120 (see Fig. 1).

Pinned to the opposite end of shaft 134 is a gear, not shown, but similar in size to gear 133, and which is arranged to drive gear 135 (see Fig. 2) and its related shaft 136, upon which the feed roller 121 (Fig. 1) is mounted; thus, it is seen, that the stacker drum and associated feed roller are rotated continuously, with an intermittent motion, as long as the motor is energized, and in synchronism with the operation of the feed rollers 80 to 83, since the controlling drive shaft 89 is the common drive for both the controlling gearings. The gear ratios between gears 124 and 133 are such that one-seventh of a revolution of gear 124 will displace the drum upon which the cards are held, one cycle point.

Gear 130 also drives gear 137 and related shaft 138, upon which shaft is mounted gear 139 which drives the gearing, comprising gears 140 and 141 pinned to shaft 142, gears 143 and 144, the latter gear being pinned to shaft 145. Upon the shaft 142, a feed roller 123 (Fig. 1) is mounted, and by means of a gear similar to gear 141, mounted on the shaft 142, the gear 146 and related shaft 147 are driven; feed roller 122 is mounted on shaft 147 and rotated thereby.

From the feed rollers 122 and 123 (Fig. 1) the cards are stacked in the hopper N, whereat provision is made to insure proper insertion of the cards in the stack, by providing a rubber stacker roll 148 mounted on shaft 145, which when rotated, by means of the said shaft, urges the cards to the right as viewed in Fig. 1.

Referring now to Fig. 9, the stacker drum 120, mounted on and rotated by shaft 134, is shown to be provided with a plurality of pivoted gripping fingers 149. These fingers are urged into card gripping position by the spring pressed plungers 150. Fixed face cams 151 are provided to be suitably disposed so as to cooperate with the fingers, to effect their opening and closing at the proper time. The timing of the fingers is such that the record card is gripped, after it passes the feed roller 121, and held securely to the drum as it rotates to further advance the card, and finally releasing and discharging it to the feed rollers 122 and 123.

Film sensing and recording means

With reference now to Fig. 1, one of the film sensing means is shown to comprise generally, a light source comprising the individual lamps 175 supported in suitable enclosures generally, indicated 176, from one side of which, individual light conducting quartz rods 177 are provided, and which are supported by the frame member 184. Mounted in the same plane as member 184 is another frame member 178 for supporting the quartz rods 182 extending to individual light responsive means 183, such as photocells. The said members 178 and 184 are provided with a small gap between them through which the photographic film 180 is fed. In the instant application, the film is fed intermittently to, and from, the sensing station, by means to be described later herein, so that the index point positions of the film are presented successively thereto. Referring to Fig. 8, a facsimile of a portion of the film record 180 is shown wherein the index points 181 are shown differentially disposed in various index point positions in the columnar areas. The quartz rods 177 and 182 are spaced in the respective members 184 and 178, so that they correspond to the individual columnar areas in position.

The method of sensing the data representations on the photographic film record will now be understood, assuming that the index points, representing the data representations, in the form of control spots are presented, intermittently, and successively to the sensing position or station, and that the individual light sources 175 are continuously energized, it is seen that, when no control spots appear at the particular index point positions analyzed, the light conducted from the light source to the film record by the one group of quartz rods is permitted to permeate the film, and be conducted by the other group of quartz rods to the related photo-cells, thereby conditioning the photo-cells in a predetermined manner. However, whenever control spots appear at the sensing position, the corresponding beams of light conducted thereto are modified or blocked off, so that the light no longer is conducted to, and impinged upon, the related photo-cells, thereby controlling the action or operation of the photo-cells. It is obvious, since the said control spots disposed on the film record in different index point positions, and since the index point positions are analyzed successively, that the different beams of light are modified, at differential times, for controlling the operation of the related light responsive means.

The method of recording the data representation in the form of differentially positioned control spots is now evident, since the only requirement necessary for this operation is for the light sources to be normally deenergized. Now, as the film record is fed to the sensing station intermittently, the individual light sources are controlled, so as to be energized at different times, thus permitting the beams of light to be conducted and directed, by the quartz rods 177, to the corresponding columnar areas, thereby effecting recording upon the light sensitive photographic film, at different positions, in the said columnar areas corresponding to the timed intervals at which the related light sources are energized.

In addition thereto, another film sensing station is provided, comprising an elongated light source 186 disposed in a suitable housing 187, which may be an integral part of the member 184, and a plurality of individual light conducting elements 188, such as quartz rods, similar to the rods 177, which are disposed in the member 184. Correspondingly positioned quartz rods 189 are provided in member 178 for conducting the light rays to individual photocells 190. It is seen, that the rods 188 and 189 are positioned, so that the control spots on the film record 180 are effective to modify the light rays conducted to photocells 190, before the said spots are effective to modify the light rays conducted to photocells 183 by the rods 177 and 182.

The purpose of this arrangement is, so that the class data disposed on the film record can be sensed at the first sensing station prior to the sensing of the amount data, on the film record, at the second sensing station. The sensed class data is compared with certain predetermined data for effecting desired class selection, field selection, and film eliminating operations, which will be set forth specifically later herein. To simplify the description to follow, the first sensing station for sensing the class data on the film will be termed the auxiliary film sensing station, whereas the second sensing station for sensing the amount data will be referred to as the main film sensing station.

Film feeding means

Figure 4:
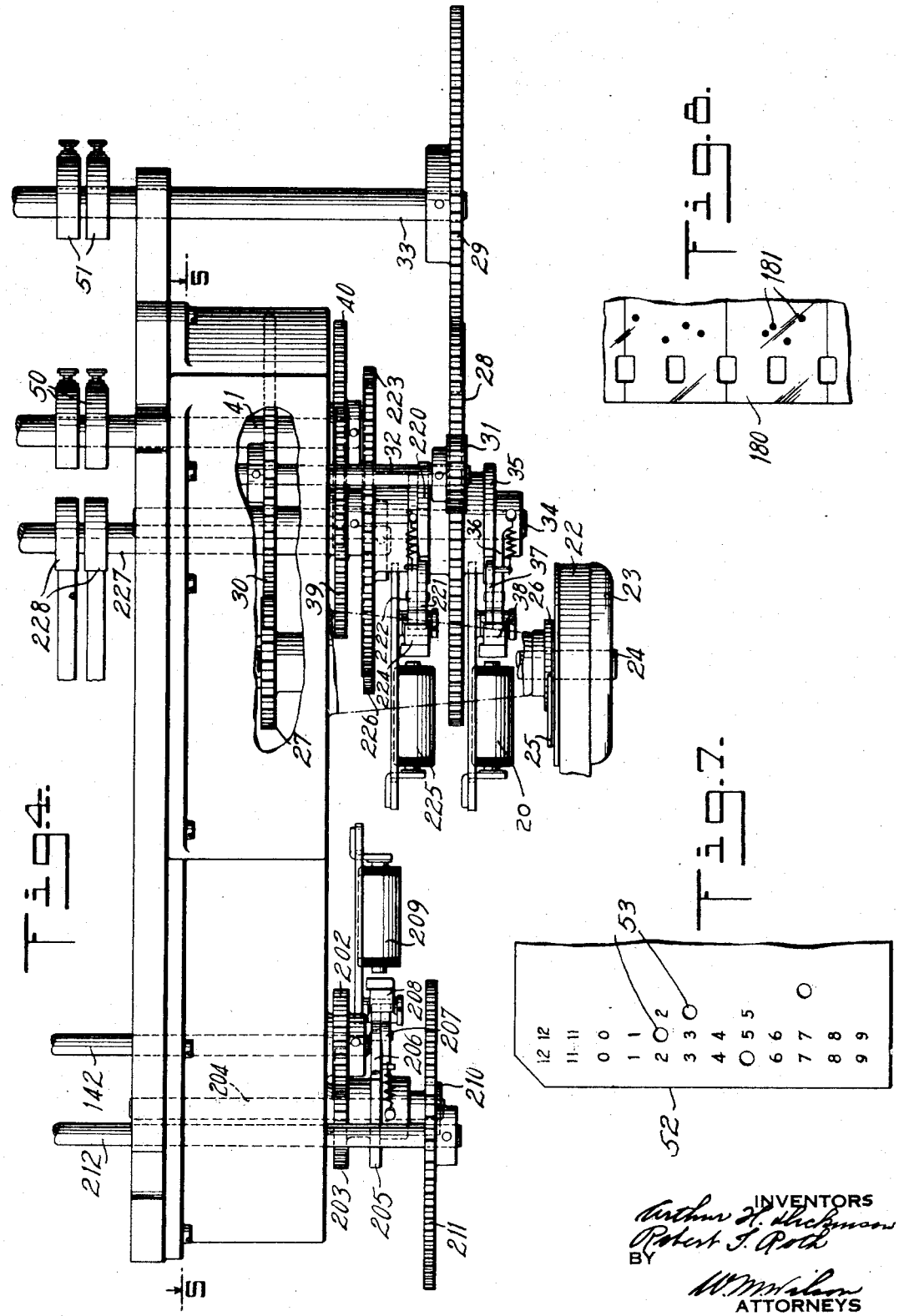
Fig. 4 is a plan view of the driving and associated gearing mechanism.

Referring now to Figs. 1, 2 and 4, the means for feeding the photographic film from the supply reel 200 intermittently to, and from, the sensing or recording station, and to the take up reel 201 comprise the following gearing, which gearing is controlled by the shaft 142, which as described hereinbefore, is rotated continuously with an intermittent motion. A gear 202, pinned to a shaft 142, is arranged to drive the gear 203 rotatably mounted on shaft 204; attached to gear 203 is the single tooth ratchet 205, which is arranged to cooperate with the dog 206, pivotally mounted on the arm 207, which arm is fixed to the shaft 204. The armature 208 of magnet 209 normally, when the magnet is deenergized, is adapted to be positioned in the path of the said arm and dog, thereby presenting engagement of the dog 206 and ratchet 205. However, upon energization of the said magnet, the armature is displaced sufficiently to release the dog, thereby permitting engagement of the said dog and ratchet, thus effecting rotation of shaft 204 by means of gears 202 and 203.

Secured to shaft 204 is the gear 210 engaging gear 211, which is fastened to shaft 212, upon which shaft 212 is mounted the film drive sprocket 213. Also secured to shaft 212 is a pulley 214 which, by the connecting belt 215, is adapted to rotate the shaft 216, upon which the take up reel 201 is mounted. Thus, it is seen, that the film 180 is fed to, and from the sensing and recording stations, intermittently, by means of the driving sprocket 213 and the described gearing. It should be mentioned, that contacts 218 are provided, and adapted to be closed by the lever 219, whenever the film record 180 is present in the sensing unit, and are arranged to be opened whenever the film record supply is exhausted.

Certain circuit controlling elements are provided, which will now be described, and which must be operated, in synchronism with, the feeding of the film, but are shown operated with a uniform motion instead of an intermittent motion, therefore, the following controlling and gearing means is provided. Referring particularly to Fig. 4, it is seen, that the continuously rotated gear 28 has secured thereto, an additional single tooth ratchet 220, which is arranged to cooperate with a dog 221, pivotally mounted on the arm 222, which arm is secured to a gear 223 rotatably mounted on shaft 34. Normally, the dog and ratchet are maintained disengaged, by means of the armature 224 of magnet 225, in a manner similarly as described hereinabove with reference to the same type of clutch. Upon energization of the magnet, the armature 224 releases the dog 221, to engage the ratchet 220 thus effecting rotation of gear 223 and the gear 226 engaged thereby (Fig. 2). Gear 226 is secured to shaft 227, which carries the series of cams 228, for controlling the associated contacts F (see Figs. 11a and 11b), the purpose of which will be understood as the description progresses. In addition thereto, cam 155 (see wiring diagram) is secured to the shaft 227 to control the operation of the associated contacts 156.

Operation of machine

Referring now to the circuit diagram, particularly Figs. 11a and 11b, the operation of the data reproducing machine will be described. The description to be given first will relate to sensing the perforated card, and reproducing the data representations sensed upon an unrecorded photographic film record, in the form of differentially positioned control spots, employing the controlling operations outlined hereinbefore. To effect this type of data reproduction, the machine must be conditioned accordingly, therefore, let it be assumed, that the main switch MS is closed, that the control switches S1 to S13 are positioned in the CF positions as shown, that perforated record cards are provided in the supply hopper M, that the unrecorded photographic film 180 is properly inserted in the machine, and that the start key is depressed to close the associated contacts SK1. A circuit is then completed from conductor 250, to coils of relays R1 and R2, contacts SK1, and contacts SK2 of the stop key to the conductor 251, causing the said relays to be energized. Upon energization of relay R1, the contacts R1a are closed to complete a circuit from the power supply source to the drive motor 21, thereby effecting operation thereof, to drive the associated gearing described hereinabove. Upon energization of relay R2, a holding circuit therefor is established, by the associated contacts R2a now closed, through the normally closed cam operated contacts C2. The contacts R2b are also closed, upon energization of relay R2, to effect energization of card feed control magnet 20, by the circuit completed by the said contacts which is as follows: conductor 250, coils of magnet 20, switch S1, contacts R2b, and the normally closed cam operated contacts C1 to conductor 251.

Upon energization of magnet 20, the shaft 34 is rotated to operate the card picker mechanism, thereby effecting the feeding of a card to the feed rollers 80 and 81. The gearing driving the feed rollers is also operated, when magnet 20 is energized and shaft 34 is operated. Thus, the record card is fed, intermittently, past the auxiliary sensing station, and up to the card perforating station, and thereby causes the contacts 110 to be closed. A circuit is then completed, during this machine cycle, from the power supply conductors 250 and 251 to the coil of relay R3, energizing said relay, and causing the contacts associated with the said relay to be closed. The P2 cam contacts are closed at the time the contacts 110 are operated, thus a circuit is established from conductor 250 to the coil of relay R9, contacts R3c, switch S4, and contacts P2 to conductor 251, energizing the said relay. A holding circuit for this relay is completed, upon closure of the associated contacts R9a, through the switch S5, and cam contacts P3 which are closed at the time contacts 110 are closed, and are maintained in this condition the remaining part of the machine cycle (see timing chart, Fig. 10). This condition occurs near the end of each machine cycle, so it is understood, that relay R9 is energized, near the end of each machine cycle, and maintained so until after the beginning of the following machine cycle.

The purpose of the circuit arrangement (shown in Fig. 11a) is to cause operation of the relays R3, R4, R7, R8, and R9 so that the contacts R3a, R4a, R7a, R8a, and R9b, which are connected in series with the contacts R2a, are all closed at one time in the cycle, and thus provide a bridge circuit for the circuit, including the cam contacts C2 (which are opened near the end of each machine cycle), so that relays R1 and R2 are maintained energized, thus providing continuous operation of the machine.

However, when first starting the machine, it will be necessary to hold the starting key depressed, for several machine cycles, until all the control circuits are properly conditioned for continuous operation. This is obvious, since at the end of the first machine cycle, the first card is just approaching the card perforating station, this being the case, it is seen, that contacts 119 at the main sensing station are still open, thus preventing operation of relay R4, and thus preventing continuous operation of the machine at this point.

Assume that the start key is kept depressed, so that another machine cycle is completed, the feed rollers 82 and 83 are then effective to feed the first card up to the main sensing station, past the card lever 118 sufficiently to close the contacts 119, but not under the sensing brushes thereat as yet. The sensing operation at the main sensing station of the first card occurs during the third machine cycle. Now, at the end of the second cycle, the following circuits at this point are conditioned: relays R3 and R4 are energized, since contacts 110 and 119, respectively, are closed. Relays R7 and R8 are energized, since contacts 54 and 218 respectively are closed, these contacts are controlled by the supply of cards in the hopper M, and the film record 180 in the machine.

It is seen now, that at the time in the second machine cycle, the cam contacts C2 are opened that cam contacts P3 are closed. It was mentioned hereinabove, that shortly before contacts P3 are closed the cam contacts P2 are operated to energize the relay R9, thus closing the associated contacts R9a at this time in the cycle, so that a holding circuit therethrough is established for the said relay, by means of the operated contacts P3; and as mentioned before, this holding circuit is maintained for the remaining part of the said cycle, and during the beginning of the following machine cycle. Thus it is seen, that from now on, during each machine cycle, a circuit is completed from conductor 250 to coil of relays R1 and R2, contacts R2a, R3a, R4a, R7a, R8a, R9b, switch S3, and normally closed contacts SK2 of the stop key to conductor 251. This circuit is completed at a time in the cycle when cam contacts C2 are opened, thus, the relays R1 and R2 are maintained energized for the beginning of each following machine cycle. Also, near the end of each machine cycle, the cam contacts C1 are closed, and maintained so until after the beginning of the following cycle, so that the magnet 20 is energized at the end of each cycle, thus effecting a card feeding operation for each machine cycle. The machine is now conditioned for continuous operation, and at the beginning of the third cycle, the card sensing operations at the main sensing station are effected. Therefore, it is evident at this time, it will be necessary to render the film feeding mechanism operative, so that the film record is positioned, intermittently, in synchronism with the progression of the record card. This is effected as follows:

Near the end of each machine cycle, the cam contacts C3 are closed, therefore, a circuit is completed from conductor 250 to the coil of relay R6, contacts R4b, R9c, and cam contacts C3 to conductor 251 energizing this relay. These circuits are maintained for the remaining part of the said cycle, and during the beginning of the following cycle, by means of cam contacts C3. Before these said cam contacts are opened, during the said following cycle, contacts P1 are closed to maintain the relay R6 energized, through the associated contacts R6b all during the sensing and recording portions of each cycle. Contacts R6a, R6b and R6c associated with said relays, are therefore operated, at all times, during the sensing and recording portions of the machine cycles.

Closure of contacts R6a completes a circuit as follows: near the end of each cycle, from conductor 250 to coils of magnets 209 and 225, contacts R6a, switch S2, contacts R12c, R2b and cam contacts C1 to conductor 251, energizing said magnets. Energization of magnet 209 permits the film feeding mechanism, described hereinabove, to become effective to feed the film record 180, intermittently, to its sensing and recording stations, in timed relationship, with the feeding of the record cards 52 past the sensing stations. Energization of magnet 225 is effective to render the control shaft 227 operative, to control the timing of the F cam contacts, which are controlled by cams 228 mounted thereon, the purpose of which will be described later.

The machine is now conditioned for continuous and automatic operation, whereby the record cards are fed, successively and intermittently, past both card sensing stations for controlling the film recording mechanism. Assume now, that the brushes 258 of the manually settable devices 255, of which four are shown in Fig. 11b, and designated A, B, C, and D, are set, to represent certain predetermined data, assume further, that the number, represented by devices A and B, is compared with the sensed class data for controlling class selection operations, and the number, represented by devices C and D, is compared with the class data, for controlling card elimination operations. With reference now to Figs. 11a and 11b these operations will be described.

The class data is sensed at the first, or auxiliary sensing station, by the brushes 112, and assuming, that certain of the sensed class data correspond to the data set up in the settable devices A and B, it is seen, that the following circuits are established: conductor 250, emitter device 59, settable devices A and B, pick-up coils a of relays R16 and R17, conductors 252, brushes 112, conducting plate 113, contacts R3g, P7 and 154 (see Fig. 10) to conductor 251, thus energizing relays R16 and R17. Holding circuits are established, for the said relays, from conductor 250 to the holding coils b of relays R16 and R17, contacts R16a, and R17a respectively, switch S13, and contacts P8 to conductor 251. The described holding circuits are maintained, during the entire sensing portion of the cycle, by means of the cam controlled contacts P8. It should be mentioned, that in the instant application, the emitter device 59 is arranged so that the brush 58 thereof engages the individual conducting segments 60, successively, and at the same instances, that the corresponding index point positions on the card are positioned past the sensing brushes 112 at the auxiliary sensing station.

Near the end of the cycle, during which relays R16 and R17 are energized, cam contacts P2 are closed (see Fig. 10) to complete a circuit from conductor 250 to coil of relay R13, contacts R16b, R17b, switch S4, and contacts P2 to conductor 251, energizing relay R13. A holding circuit is then established from conductor 250 to coil of relay R13, contacts R12a, switch S5, and contacts P3 to conductor 251, which is maintained until the following cycle. At the beginning of the said following cycle, due to energization of relay R13, the relay R14 is energized, by means of the circuit established from conductor 250, to coil of relay R14, contacts 13b, switch S7 and contacts P4 to conductor 251. The holding circuit for this relay is as follows: conductor 250, coil of relay R14, contacts R14a, switch S8, and contacts P5 to conductor 251, which is maintained until near the end of this cycle, by the cam contacts P5.

Energization of relay R14 causes the associated contacts R14b and R14d to be closed, and contacts R14c and R14e to be opened, and in this manner, connecting the corresponding light sources 175 to the sensing brushes 116, for the particular fields on the photographic film record, in which recording is to be effected of the control spots, representing the amount data, sensed on the record card of which the class data thereon corresponded to the preset data in devices A and B.

It is understood, that the film record 180 is fed in synchronism with record cards so that, for example, when the "9" index point positions on the cards are presented to the sensing brushes 116, the film record is presented to the recording station, so that the "9" index point positions of the individual frames, or portions of the film record, are presented to the recording position, namely, the position whereas the quartz rods 177 are disposed. Therefore, at the particular timed intervals, the individual light sources 175 are energized by means of the established card sensing circuits, the photographic film record is exposed to the light rays, at such intervals, to effect recording thereon, in the form of control spots as indicated in Fig. 8, at differential positions, in accordance with the data sensed.

It is evident now, the amount data disposed on the card, the class data of which correspond to the preset data in set-up devices A and B, is sensed by the brushes 116 to complete the following circuits, at differential times, in accordance with the value of the sensed data perforations; conductor 250, contacts R15b, switch S9, the light sources 175 connected to contacts R14b and R14d, conductors 253, sensing brushes 116, conducting roller 117, contacts P6, R6c, and 57 to conductor 251, energizing said light sources, at the same instance that the perforations in the record card are sensed, thus recording the sensed data representations upon the film, record in the form of control, spots in the particular columns or fields thereon, corresponding to the energized light sources. Whenever the compared data correspond, relay R14 is energized, thereby effecting recording upon the film record, in the fields thereon, controlled by the light sources connected to contacts R14b and R14d. However, when the compared data does not correspond, both relays R16 and R17 are not energized, during the same cycle, and thereby energization of relay R14 is not effected, thus causing the light sources 175 connected to contacts R14c and R14e to be energized, when the perforations on the card are sensed, for recording the control spots in the columns, or fields, associated with the last mentioned light sources.

In the manner just described, the amount data on a record card, when sensed, can be recorded in different fields on the photographic film record, depending upon whether or not, the class data on the said record card corresponds to the data, set up in the manually settable devices, the value of the class data determining the particular field in which the recording is effected.

When it is desired, to eliminate the recording of the data in certain record cards upon the film record, the contacts R15b which are included in the circuits for the light sources 175 are opened, during the sensing of said cards, so that, upon sensing the perforations by brushes 116, circuits to the light sources cannot be completed. Assume, therefore, that it is desirous to eliminate recording upon the film record, the data on the cards which have class data corresponding to the preset data. For these assumed conditions, it is seen, upon sensing the class data that the following circuits are established; conductor 250, emitter device 59, manually settable devices C and D, pick-up coils a of relays R18 and R19, conductors 254, brushes 112, plate 113, contacts R3g, P7 and 154 to conductor 251, energizing the said relays. The holding circuits for said relays are from conductor 250 to the holding coils b, contacts R18a, and R19a, respectively, switch S13 and contacts P8 to conductor 251. During the cycle the said class data is sensed, relay R12 is energized, by means of the circuit, from conductor 250 to coil of relay R12, contacts R18b and R19b, switch S4, and contacts P2 to conductor 251. The holding circuit for this relay is as follows: conductor 250, coil of relay R12, contacts R12a, switch S5 and contacts P3 to conductor 251, which is maintained for the following cycle. During the said following cycle, relay R15 is energized as follows: conductor 250, coil of relay R15, contacts R12b, switch S7, and contacts P4, to conductor 251. This last mentioned relay is maintained energized, most of the cycle, by the holding circuit, from conductor 250 to coil of relay R15, contacts R15a, switch S8 and contacts P5 to conductor 251. As mentioned before, energization of relay R15 causes the contacts R15b to open, thus preventing energization of the light sources 175, and thereby eliminating any recording upon the film record of the data on the record cards which have class data disposed thereon corresponding to the data set up in the settable devices C and D.

Film feeding operations are also suspended as long as relay R12 remains energized. This condition is effected, by deenergizing the film feeding control magnet 209, by opening the normally closed R12c associated with, and controlled by, the coil of relay R12.

For card field selection operations, refer to Figs. 11a and 11c, and assume, that it is desired to record upon the film record in the same fields, the data sensed in different fields upon the record cards, the sensing of the particular fields depending upon, whether or not the class data sensed, correspond to the data set up in the manually settable devices. Upon correspondence of the compared data, relay R14 is energized for the entire sensing portions of the cycle, similarly as described in detail hereinabove, for this reason, repetition of the detailed description of these control circuits is deemed unnecessary. Thus, it is seen, that whenever relay R14 is energized, the data sensed by the brushes 116, which are connected directly to contacts R14c and R14e, is recorded in certain columns of fields upon the film record, in the manner described hereinbefore. Whenever the relay R14 is deenergized, which condition is indicative of the fact that the compared data disagree, recording, in the same said field, upon the film record, is effected of the data sensed by the brushes connected to contacts R14b and R14d.

In view of the detailed description just set forth, and since the driving mechanism, feeding mechanisms, and control circuits are operated and conditioned in the same manner, for reproducing the data sensed upon recorded film records, or the blank record cards in the form of perforations, the following brief description is believed to be sufficient. Assume, now that all the control switches S1 to S13 are positioned in the FC position, and, that the start key is depressed to close the contacts SK1, long enough to condition the machine for automatic operation. For this description, reference should be made to the circuit diagrams shown in Figs. 11a and 11d. It will be understood, for this type of operation, whereby the recorded film record is sensed, at the second or main film sensing station, and the sensed data is reproduced or perforated on the blank record cards accordingly, that upon feeding the film record, the record cards must be presented at that time at the punching station. As it will be seen from the description to follow, the film record must be properly positioned in the machine, and two blank frames thereof, are fed to the film sensing station upon starting the machine in operation; of course, it will be evident too, that in the event this is not done, no harmful results are effected with respect to the instant invention, the suggestion is made merely as a practical expedient.

Upon depression of the start key, the relays R1 and R2 are energized, causing operation of the driving motor 21, and associated gearing, by means of operated contacts R1a and energization of the control magnets 209 and 225, causing operation of the film feeding mechanism, and the F cam shaft as described hereinabove. At this time, cam contacts C4 are closed to energize relay R11, and to establish a holding circuit therefor, through the now closed contacts R11a and cam contacts F5. Thus, it is seen, that upon depression of the start key, the card feed magnet 20 is also energized, by the following circuit, from conductor 250 to coils of magnet 20, contacts R11b, normally closed contacts R3d, switch S2, contacts R12c, R2b and contacts C1 to conductor 251, thereby effecting a card feeding operation. Near the end of the first machine cycle, the contacts 110 are operated, by the card feed therepast, to energize relay R3, and cause the contacts R3c to be closed, thus opening the circuit to the feed control magnet 20 for the following machine cycle. This is effected, since contacts R10b are not closed until near the end of the said following cycle, when cam contacts F3 are closed to establish a circuit from conductor 250 to coil of relay R10, contacts F3 to conductor 251 energizing said relay, and establishing a brief holding circuit therefor, through contacts R10a and cam contacts F4. Therefore, at the beginning of the third cycle, the magnet 20 is again energized, through a circuit from conductor 250 to coil of magnet 20, contacts R10b, contacts R3e, switch S2, contacts R12c, R2b, and cam contacts C1 to conductor 251, whereby card feeding operations are effected, and by means of the feed rollers 80 and 81, the first card is now fed. intermittently, past the perforating station.

Upon properly conditioning the machine with record cards, and a control film record, the contacts 54 and 218 respectively are operated to energize relays R7 and R8 respectively. Thus, it is seen, that a holding circuit, bridging the holding circuit including contacts C2, is established for relays R1 and R2, by the series circuit arrangement of contacts R2a, R7b, R8b, and R10c, thus establishing continuous operation of the machine.

It should be understood now, that as the different index point positions are advanced to the punching station, the corresponding index point positions on the film record are sensed at the main film sensing station, for example, as the "9" index point position on the film record is sensed, the "9" index positions of the record cards are at the punching station under the perforating plungers. As the differentially positioned control spots on the film record are introduced at the sensing position, the presence of the control spots is effective to modulate or interrupt the impingement of the light rays from the light sources upon the related photo-cells. It is seen, that, by means of switches S10 and S12, all the individual light sources are energized continuously. Whenever no control spots are present, at the main sensing station, the light rays are conducted by the quartz rods 177 and 182 therefrom through the transparency of the film record to the related photo-cells, thus conditioning the said cells. These light responsive means 183 are connected to any well known type of amplifiers, generally indicated at 260, which in turn are connected to control relays 261. The amplifiers are adjusted so, that, when light impinges upon the light responsive means, no current flows in the output circuit thereof, however, when the light rays are interrupted, by the presence of control spots on the film record, the light responsive means and amplifier are conditioned so as to permit current to flow in the output circuit of the amplifier units, this is a well known expedience in the art and needs no further explanation.

It is understood now, that upon the presence of a control spot at the main film sensing station, the corresponding light responsive means and amplifying means are conditioned, so as to effect energization of the related relays 261 when they, by means of the associated contacts 262, complete circuits through the punch control magnets 66, as follows: from conductor 250 to contacts R15b, switch S9, punch magnets 66, contacts R14c, R14e, 262, common conductor 263 contacts 57 to conductor 251, energizing the corresponding punch magnets 66. Energization of the said magnets operates the related punch plungers to effect perforation of the record card, at the particular columnar index point positions, corresponding to the index point positions in which the sensed control spots appeared on the film record.

The description, just set forth, did not include any consideration of class selection, field selection or film frame elimination operations. It is understood, that the auxiliary, or first film sensing station, comprising light source 186, quartz rods 188 and 189 and photo-cells 190, is effective to sense the class data disposed on the film record, prior to the sensing of the amount data at the main sensing station, and, as will be shown, is effective to control the following operations, when connected in the circuits, as shown in the circuit diagrams referred to in this description.

Assume now, that class selection operations are to be effected, and that the manually settable devices A and B are set up with predetermined data, which correspond to the class data sensed at the auxiliary sensing station. For this condition, the following circuits are established, at differential times, during the sensing cycle: conductor 250, emitter device 59, settable devices A and B, pick-up coils a of relays R16 and R17, conductors 264, contacts 265 of relays 266, contacts 156 to conductor 251, energizing said relays. The relays 266 are energized, by means of the conditioned photo-cells 190 and associated amplifiers 267, whenever the rays of light from the source 186 are modified by the differentially positioned class control spot representations, precisely as relays 261 are energized, and described hereinbefore.

Holding circuits are established for relays R16 and R17 as follows: conductor 250, holding coils b of the said relays, contacts R16a and R17a, switch S13 and contacts F8 to conductor 251. Energization of the said relays is effective to energize relays R13 and R14, as described hereinabove, whereby relay R14 is maintained energized, for most of the cycle following the said sensing cycle. Energization of relay 14 causes the punch control magnets 66, connected to contacts R14b and R14d, to be energized, whenever the compared data agree, to effect perforating of the record cards, in different fields, in accordance with the amount data sensed at the main film sensing station, than when the compared data does not correspond.

For film frame eliminating operations, assume that, the class data sensed correspond to the data set up in settable devices C and D (Fig. 11d). For these conditions, relays R18 and R19 are energized, causing in turn relays R12 and R15 to be energized (similarly as described hereinabove), thereby causing contacts R15b and R12c to be opened, during the cycle following the sensing cycle. Opening of contacts R15b prevents the punch control magnets 66 from being energized, and opening of contacts R12c suppresses further card feeding operations, due to deenergization of magnet 20, as long as the compared data correspond.

Figure 11E:
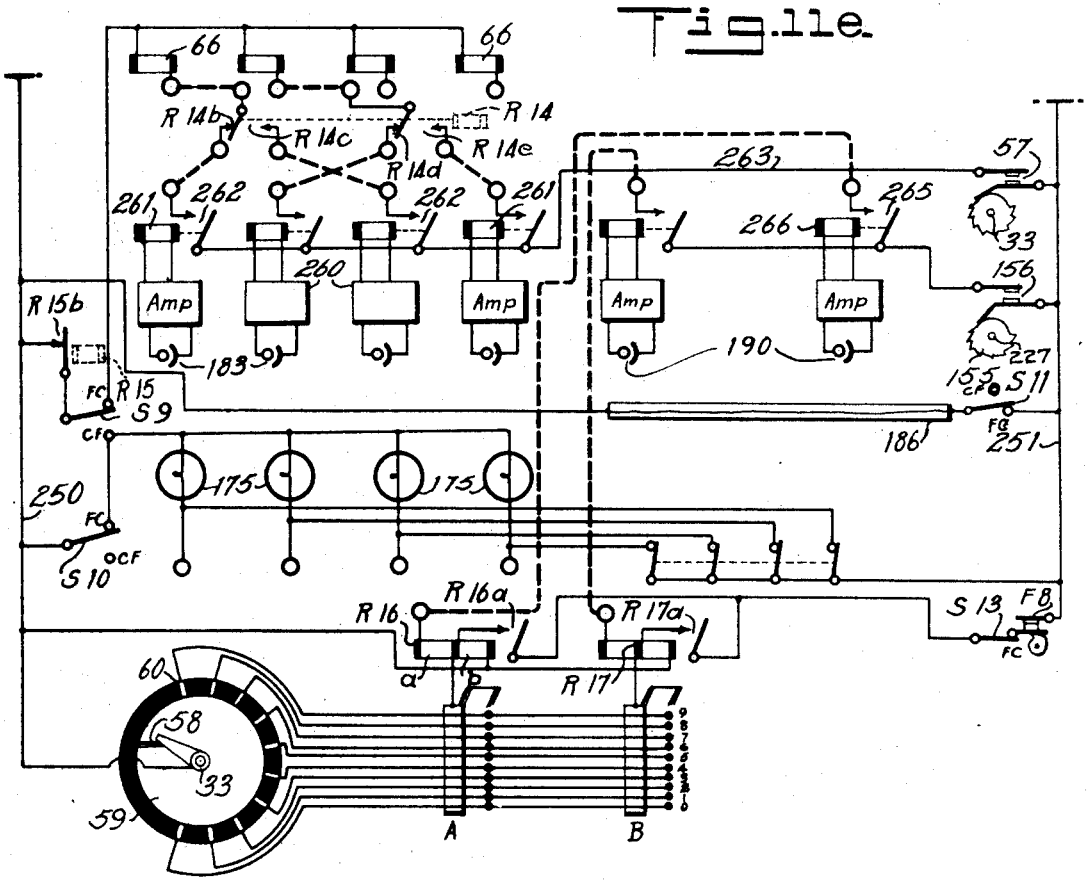

For field selection operations, refer now to Figs. 11a and 11e, and assume, that the sensed class data, and the data set up in devices A and B, correspond, to effect energization of relay R14, similarly as described hereinabove. For these conditions, it is seen, that the punch magnets 66 connected to contacts R14c and R14e are energized, and controlled in accordance with the data sensed at the main film sensing station, and effective to condition the associated photo-cells 183, amplifiers 260 and relays 261. When the compared data does not correspond, relay R14 remains deenergized, and the same said punch magnets 66 are then energized, and controlled in accordance with the data sensed in those fields, on the film record; which are effective to condition the photo-cells 183, amplifiers 260 and relays 261, the contacts 262 of which are connected directly to contacts R14b and R14d. In this manner, it is seen, that the same punch magnets are controlled, by the data disposed in different fields on the film record, upon sensing thereof at the main film sensing station.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A data reproducing machine controlled by individual records having data designations recorded thereon for reproducing the data on blank records, comprising two groups of record sensing and related recording means for sensing and recording on the records, respectively, the sensing means of each group, comprising individual means for sensing classification and amount data, individual means for feeding blank or recorded records to the sensing and recording means of each group, means for operating the said individual feeding means, in synchronism, so that the records are presented to the respective sensing and recording means in a predetermined time relationship, means for alternately conditioning either sensing means and related recording means of the said groups for sensing the recording operations, means for controlling the conditioned recording means to reproduce the amount data, upon the blank records presented thereto, in accordance with the data sensed upon the recorded records presented to the conditioned sensing means, control means controlled by the classification data sensing means corresponding to the said conditioned sensing means, and means controlled by the said control means for controlling and selectively and alternately the amount data sensing or recording operations upon the sensing of predetermined classification data.

2. The invention set forth in claim 1 in which one group of the said record sensing and recording means comprises perforated record card sensing means and blank record perforating means respectively.

3. The invention set forth in claim 1, in which, one group of the said record sensing and recording means comprises perforated record card sensing means and record card perforating means, respectively, and the other group of record sensing and recording means comprises photographic film record sensing and photographic recording means, respectively.

4. A data reproducing machine controlled by individual records having data designations recorded thereon for reproducing the data on blank records comprising two groups of record sensing and related recording means for sensing and recording on the records, respectively, the sensing means of each group, comprising individual means for sensing classification and amount data, individual means for feeding blank or recorded records to the sensing and recording means of each group, means for operating the said individual feeding means, in synchronism, so that the records are presented to the respective sensing and recording means in a predetermined time relationship, means for alternately conditioning either sensing means and related recording means of the said groups for sensing and recording operations, means for controlling the conditioned recording means to reproduce the data, upon the blank record presented thereto, in accordance with the data sensed, upon the recorded records presented to the conditioned sensing means, means for storing predetermined data, means for comparing the classification data, sensed by the classification data sensing means corresponding to the conditioned amount data sensing means, and the stored data, and means controlled by the comparing means when the classification data bears a predetermined relationship to the stored data for controlling selectively and alternately the amount data sensing or recording operations.

5. A data reproducing machine controlled by individual records having data designations recorded thereon in predetermined fields for reproducing the data on blank records, comprising two groups of record sensing and related recording means for sensing and recording on the records, respectively, the sensing means of each group, comprising individual means for sensing classification and amount data, individual means for feeding blank or recorded records to the sensing and recording means of each group, means for operating the said individual feeding means, in synchronism, so that the records are presented to the respective sensing and recording means in a predetermined time relationship, means for alternately connecting the amount data sensing means of one of the said groups to the related recording means of the other said group, for alternately reproducing the data upon the blank records presented thereto, in accordance with the data sensed upon the recorded records presented to the said connected sensing means, control means controlled by the classification data sensing means corresponding to the said connected sensing means, upon sensing predetermined classification data, means for controlling the recording means, whereby the data to be reproduced may be recorded in a predetermined field on the record presented thereto, and means, controlled by the said control means, for controlling the said recording means controlling means, whereby the data to be reproduced is recorded in a different field on the record.

6. A data reproducing machine controlled by individual records having data designations recorded thereon in a plurality of fields for reproducing the data on blank records, comprising two groups of record sensing and related recording means for sensing and recording on the records, respectively, the sensing means of each group, comprising individual means for sensing classification data and amount data, individual means for feeding blank or recorded records to the sensing and recording means of each group, means for operating the said individual feeding means, in synchronism, so that the records are presented to the respective sensing and recording means in a predetermined time relationship, means for alternately connecting the amount data sensing means, of one of the said groups, to the recording means, of the other said group, for alternately reproducing the data upon the blank records presented thereto, in accordance with the data sensed upon the recorded records presented to the said connected sensing means, means controlled by the classification data sensing means, corresponding to the said connected sensing means, upon sensing predetermined classification data, and means, controlled by the last mentioned controlled means, for controlling the said connected sensing means, whereby the data disposed in predetermined fields are sensed for controlling the said connected recording means in accordance therewith.

7. A data reproducing machine controlled by individual records having data designations recorded thereon for reproducing the data on blank records, comprising two groups of record sensing and related recording means for sensing and recording on the records, respectively, the sensing means of each group, comprising individual means for sensing classification data and amount data, individual means for feeding blank or recorded records to the sensing and recording means of each group, means for operating the said individual feeding means, in synchronism, so that the records are presented to the respective sensing and recording means in a predetermined time relationship, means for alternately connecting the amount data sensing means, of one of the said groups, to the recording means, of the other said group, for reproducing the data upon the blank records presented thereto, in accordance with the data sensed upon the recorded records presented to the said connected sensing means, means controlled by the classification data sensing means, corresponding to the said connected sensing means, upon sensing predetermined classification data, and means controlled by the last mentioned controlled means for rendering inoperative the alternately connected recording means, whenever the said predetermined classification data is sensed thereby preventing recording at such times of the data sensed.

8. A data reproducing machine controlled by individual record cards having data designations recorded thereon for reproducing the data on blank photographic film records, comprising record card sensing means for sensing the data designations on the recorded records and photographic film record recording means for recording data upon the blank photographic film records, the said sensing means comprising individual means for sensing classification and amount data, means for feeding recorded record cards to the card sensing means, means for feeding blank photographic film records to the said film recording means, means for operating the said individual feeding means, in synchronism, so that the records are presented to the respective sensing and recording means in a predetermined time relationship, means for connecting the record card amount sensing means to the photographic film record recording means for reproducing the data upon the film record, in accordance with the data sensed upon the record cards, means controlled by the classification data sensing means upon sensing predetermined classification data, and means controlled by the last mentioned controlled means for alternately controlling the operations of the sensing or recording means, whenever the said predetermined classification data is sensed.

9. A data reproducing machine controlled by individual record cards having data designations recorded thereon for reproducing the data on blank photographic film records comprising record card sensing means for sensing the data designations on the recorded records and photographic film record recording means for recording data upon the blank photographic film records, the said sensing means comprising individual means for sensing classification and amount data, means for feeding recorded record cards to the card sensing means, means for feeding blank photographic film records to the said film recording means, means for operating the said individual feeding means, in synchronism, so that the records are presented to the respective sensing and recording means in a predetermined time relationship, means for connecting the record card amount sensing means to the photographic film record recording means for reproducing the data upon the film record, in accordance with the data sensed upon the record cards, means for storing predetermined data, means for comparing the data sensed by the classification data sensing means and the stored data, and means controlled by the comparing means, when the classification data bears a predetermined relationship to the stored data, for controlling the sensing or recording means.

10. A data reproducing machine controlled by individual photographic film records having data designations recorded thereon for reproducing the data on blank record cards, comprising photographic film record sensing means for sensing the data designations on the photographic film records and record card recording means for recording data on the record cards, the said sensing means comprising individual means for sensing classification and amount data, means for feeding recorded photographic film records to the film record sensing means, means for feeding blank record cards to the said card recording means, means for operating the said feeding means, in synchronism, so that the records are presented to the respective sensing and recording means in a predetermined time relationship, means for connecting the sensing means to the recording means for reproducing the data upon the record cards, in accordance with the data sensed upon the photographic film records, means controlled by the classification data sensing means upon sensing predetermined classification data, and means controlled by the last mentioned controlled means for alternately controlling the sensing or recording means, whenever the said predetermined classification data is sensed.

11. A data reproducing machine controlled by individual photographic film records having data designations recorded thereon for reproducing the data on blank record cards, comprising photographic film record sensing means for sensing the data designations on the photographic film records and record card recording means for recording data on the blank record cards, the said sensing means comprising individual means for sensing classification and amount data, means for feeding recorded photographic film records to the film record sensing means, means for feeding blank record cards to the said card recording means, means for operating the said feeding means, in synchronism, so that the records are presented to the respective sensing and recording means in a predetermined time relationship, means for connecting the sensing means to the recording means for reproducing the data upon the record cards, in accordance with the data sensed upon the photographic film records, means for storing predetermined data, means for comparing the data, sensed by the classification data sensing means, and the stored data, and means controlled by the comparing means, when the classification data bears a predetermined relationship to the stored data, for alternately controlling the sensing or recording means.

ARTHUR H. DICKINSON.
ROBERT I. ROTH.

CERTIFICATE OF CORRECTION.

Patent No. 2,224,762. December 10, 1940.

ARTHUR H. DICKINSON, ET AL.

It is hereby certified that error appears in the printed specification of the above numbered patent requiring correction as follows: Page 10, second column, line 48, claim 1, for the article "the" after "sensing" read --and--; line 58, same claim, strike out "and" before "selectively"; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.